May 26, 1970     G. O. BAUMBRUCKER     3,514,107
SLOTTED RACING GAME
Filed Feb. 8, 1968     2 Sheets-Sheet 2
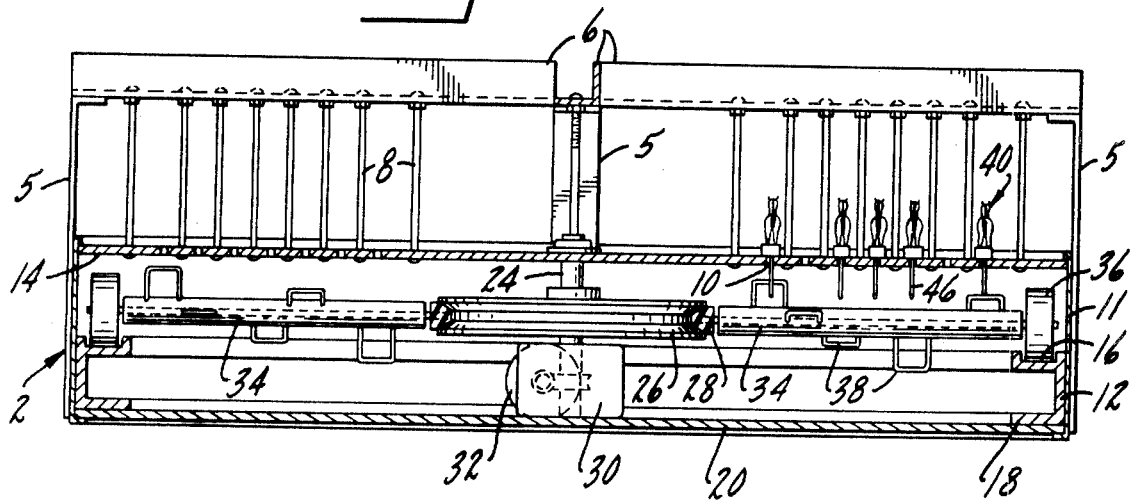
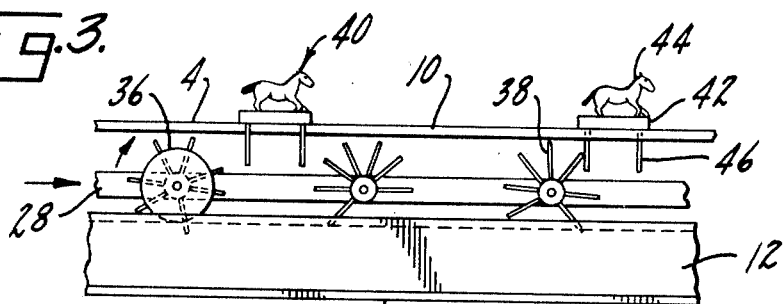
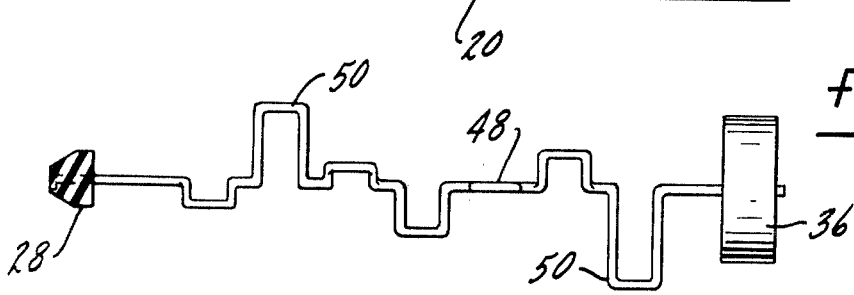
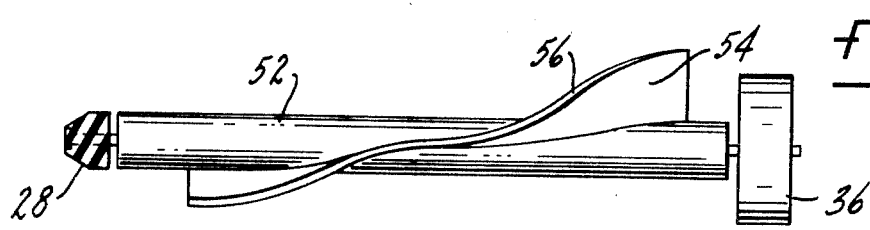
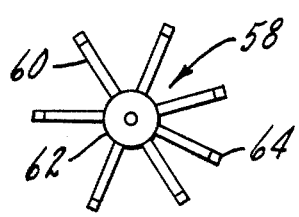
INVENTOR.
George O. Baumrucker
BY Mann, Brown & McWilliams
Attorneys.

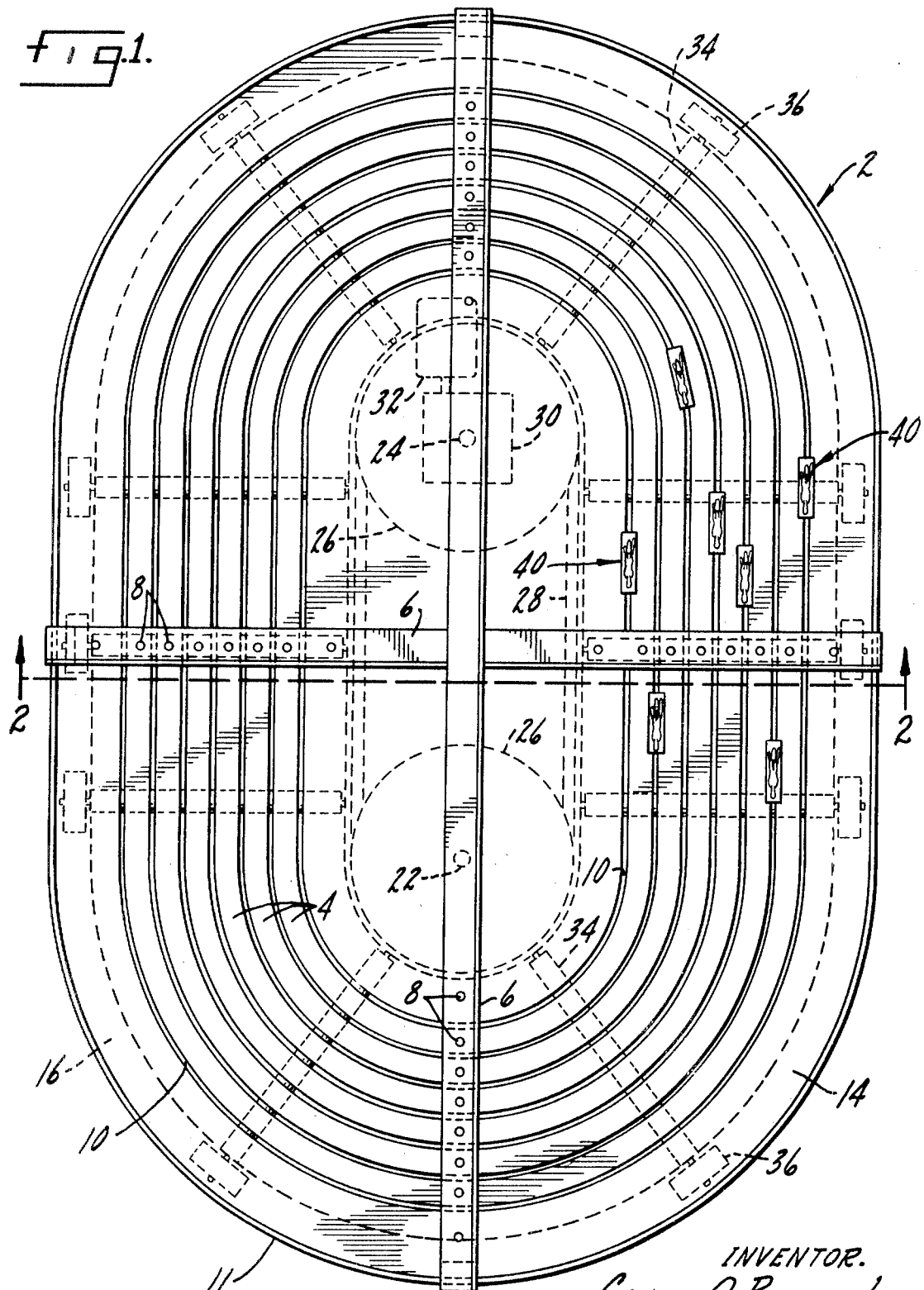

United States Patent Office 3,514,107
Patented May 26, 1970

3,514,107
SLOTTED RACING GAME
George O. Baumbrucker, 30 S. County Line Road,
Hinsdale, Ill. 60521
Filed Feb. 8, 1968, Ser. No. 703,987
Int. Cl. A63f 9/14
U.S. Cl. 273—86                                     6 Claims

ABSTRACT OF THE DISCLOSURE

A slotted racing course including structure for sporadically moving the racing figures. Each racing figure has a projection which extends downward through a slot in the course. The structure for sporadically moving the racing figures includes a centrally located motor driven endless belt which moves in a horizontal plane beneath and substantially parallel to the course. Rod members, extending radially outward from spaced points along the belt, rotate about their own axes as they are moved in a circular path with the belt. The downward extending projections on the racing figures cooperate with impelling members carried by the rods. The impelling members may take the form of staples randomly spaced apart along the rods, crank arms like those on the crank shaft of an automobile, helical shaped projections, or magnets.

BACKGROUND OF THE INVENTION

This invention relates to an amusement device simulating a horse race or, a similar type of race, wherein purely mechanical components comprise the principal components of the apparatus. Because of the simplified mechanical design of the device, a low cost amusement device requiring little or no upkeep and maintenance is feasible. Heretofore, amusement devices of this type have often utilized complicated electronic means to simulate a race event. This has necessarily, because of cost and inherent tendency to malfunction, limited acceptance of these devices to the general public.

SUMMARY OF THE INVENTION

The herein disclosed invention therefore seeks to overcome the heretofore enumerated deficiencies of amusement devices simulating races and the like. Briefly, the amusement device comprises a base means having at least one continuous slot therein which is in the form of a race course configuration. A movable means ideally straddles the slot and is driven about the course by an actuating means which may take a myriad of forms. The actuating means periodically actuates the movable means to be driven about the course and is of simplified construction.

BRIEF DESCRIPTION OF THE DRAWINGS

FIG. 1 is a plan view of the amusement device of this invention depicting one specific embodiment illustrating its application to simulation of a horse race;

FIG. 2 is a view taken along the line 2—2 of FIG. 1;

FIG. 3 is a partial side view showing the manner in which the movable horses are actuated;

FIG. 4 is a fragmentary view showing another embodiment of one aspect of the invention;

FIG. 5 is a fragmentary view of another embodiment of the invention depicted in FIG. 4; and FIG. 6 schematically illustrates still another embodiment of the invention depicted in FIG. 4.

DESCRIPTION

Throughout the several views, the same numerals of reference are utilized to designate like elements. It is to be understood that the hereinafter following commentary is to be taken as illustrative of the preferred embodiments of the invention and is in no way to be taken as delimiting of the invention herein disclosed. The only limitations o be given the invention are those contained in the hereinafter appended claims.

Referring to the drawings, a base member 2 is made up of a plurality of oval configured sections 4, each individually supported from flanged support members 6 by rod members 8 such that they are in spaced relationship to thereby form continuous slots 10. Support brackets 5 are secured to members 6 to support same. It will be noted that the slots 10 define a plurality of courses around which race replica means may be driven.

Base 2 preferably has side panels 11 supported from side track member 12 so that one may not view the position of elements of the apparatus and thus heighten the enjoyment derived therefrom. Track member 12 is congruent to the perimeter defined by the outermost oval shaped member 14 and is shown as being in the form of a modified half-I members in cross-section having a wheel supporting surface 16 and a base 18 which is secured in this instance to cross member 20 of base 2. To cross member 20 are secured, in rotative relationship, shafts 22 and 24 disposed in spaced relationship at each end of the oval track. Secured to shafts 22 and 24 are typical pulleys 26 which support and carry endless belt 28. Gear box and gear train member 30 along with motor 32 completes the power linkage by which the shaft 24 is rotated and, hence, the pulleys 26.

Randomly-spaced rods 34 are secured to endless belt 28 by means well known in the art and are supported on their opposite ends by rotatively mounted wheels 36 which ride on the track surface 16 defined by the track member 12. Secured to the rods 34 are impeller means such as staples 38 which may be randomly spaced along the extent of rod 34. It is readily apparent that the rod 34 extends across the width of the track defined by the slots 10.

Race participant replica means 40, in this instance taking the form of horses, are positioned in straddling relationship of the slots 10. Each of the race replica means 40 has a base 42 supporting a horse simulation 44 and has depending means 46 which extend through the slot 10 to a satisfactorily length to be contacted by impelling means such as formed by the plurality of staples 38. As endless belt 28 revolves around the center points of shafts 22 and 24, rods 34, with the impelling surfaces 38 thereon, rotate on their own axes and follow the oval track and because of the depending projections 46, will contact one or a plurality thereof to thereby urge the movable race replica means 40 forwardly in sporadic fashion. Each of rods 34 and the respective wheel 36 rotate together about their own axis with wheels 36 following the path formed by track surface 16. In some instances, it may be found desirable to raise the track surface 16 such that the wheel 36 is above the axis of the rod in order to compensate for the longer distance that the race replica means furthest from the center of the track must follow. However, in actual practice, the difference in distance has not been found to detract significantly from the outcome of the races. Should it be decided to compensate for this factor, it is at once apparent that by elevating the end of the rod 34, the impeller surfaces 38 located furthest from the belt 28 will engage the depending rods 46 over a greater length and, hence, for a greater period of time to thereby urge the outermost positioned horse forward in equalizing effect with the remainder of the race replica means 40 spaced inwardly of the outermost horse.

In FIGS. 4 and 5, an alternate type of actuating means is shown which may be used interchangeably with that depicted in FIGS. 1 and 2. In this instance, the rod 48 (FIG. 4) is in the form of a crank shaft as normally found on an automobile and the convoluted design in the plane radially of the axis of the rod or shaft 48 provides impeller surfaces 50 which, because of the random spacing, will provide the same actuating effect as heretofore described. Likewise, in FIG. 5, the shaft 52 carries a helical-shaped means 54 which provides impelling surface 56 to engage and contact the depending projections from the race participant replica means as previously described.

In the FIG. 6 embodiment, there is depicted an actuating means 58 having spaced projecting rays 60 emanating from the shaft 62 at the ends of which are supported magnets 64. By disposing the magnets 64 in magnetic relationship with magnets supported by the bases 42 of the race replica means or by providing magnetized depending rods 46 of the race replica means or by having the magnets as the bases 42 themselves, it is at once apparent that the race replica means may be propelled around the course magnetically.

A brief word about the operation of the device will indicate the manner in which the device may be used. At the initial start of a simulated race, the race replica means 40 are manually positioned at a preselected starting line and where it is desired to conduct the race in true simulation, an odds board or wheel may be prepared whereby each player is given particular odds for the particular horse chosen. This then, of course, determines winnings to be had for the winning horse. After the odds and horses are selected, the motor 32 is started causing rotation and movement of the belt 28 which moves the rods 34 about the track. The actuating means such as staples 38, convolutes 50 or impelling surface 56 may be so positioned as to accurately fix the number of times the impelling surfaces will contact the depending projections 46 and, additionally, the length of the projections 46 and the number of rods 34 will necessarily dictate the number of times and the length of movement that the individual race replica means 40 are propelled forward about the track.

While the base structure has been depicted as oval in configuration, it is at once discernible that other configurations may be utilized. For instance, instead of an oval track, an annular one may be utilized and indeed a single wheel could be used supported at its center and having rays extending therefrom which may or may not be supported at the ends thereof which would carry actuating means to actuate the race replica means as heretofore described. Additionally, the power means need not necessarily be an electric motor in that the device may be hand-actuated and, finally, the race replica means may take the form of motorcycles, racing automobiles and any other such configuration that would normally be expected to engage in a race.

Ideally, the oval sections forming the race course should have a coating at least on the upper surface thereon to provide as low a coefficient of friction between it and the race replica means as possible. Likewise, the base of the race replica means, at least at the contact surface with the oval sections, should be of a similar material so as not to retard movement about the course. As those skilled in the art will at once recognize, the track surface 16 and the wheel 36 may utilize a high friction material so as to insure direct non-slipping contact between wheel and track surface.

Additionally, the track surface 16 of member 12 may be made adjustable toward or away from base 18 to vary the contact surface between, for instance, staples 38 and depending projections 46. These and other alternatives will make themselves readily apparent to those skilled in the art, all of which fall within the spirit and scope of the invention, and it is intended that they be covered by the appended claims.

The embodiments of this invention in which an exclusive property or privilege is claimed are defined as follows:

1. An amusement device or the like for simulating a race comprising:
   (a) a support structure supporting a base means having a plurality of spaced, continuous slots defining a course;
   (b) race participant replicas movably associated with each of said slots to be driven about said course and each having depending actuation means extending through said slots;
   (c) an endless belt supported by first and second spaced, vertically extending supports, and adapted to be driven along an endless path in a substantially horizontal plane perpendicular to said supports, said belt having spaced, elongated rod members having their horizontal axes positioned substantially perpendicular to said vertically extending supports and in said horizontal plane and having first ends thereof rotatively secured to said belt, and second ends thereof supported by wheel members, each of said rod members being rotatable about its own axis as said wheel members are supported in contact with an outer track member following the outer periphery of said course as said belt is driven along its endless path; and
   (d) power means for driving said belt along said endless path in a substantially horizontal plane, and means fixed to said rod members for rotation therewith and for sporadically coacting with said depending actuation means to move said replicas about said course.

2. The device in accordance with claim 1, wherein said base means comprises a plurality of independently-supported, spaced and congruently-shaped members to thereby form said plurality of continuous slots.

3. The device in accordance with claim 2 wherein said first and second spaced supports for said endless belt are disposed at opposite ends of said base means.

4. The device in accordance with claim 3, wherein said course is of oval configuration and said means fixed to said rod members to sporadically coact with said depending actuation means to move said replicas are randomly spaced so as to unpredictably move said replicas.

5. The device in accordance with claim 4 wherein said replicas each straddle each slot and said depending actuation means are adapted to be periodically actuated by impeller surfaces fixed to said rod members and rotated therewith.

6. The device in accordance with claim 5 wherein said replicas are in the configuration of race horses.

References Cited

UNITED STATES PATENTS

| | | | |
|---|---|---|---|
| 2,643,885 | 6/1953 | Ford | 273—86 |
| 2,668,389 | 2/1954 | Morrison | 273—86 X |
| 3,190,652 | 6/1965 | Dunn | 273—86 |
| 3,338,577 | 8/1967 | Johansson | 273—86 |

GEORGE J. MARLO, Primary Examiner

T. ZACK, Assistant Examiner

PO-1050
(5/69)

UNITED STATES PATENT OFFICE
CERTIFICATE OF CORRECTION

Patent No. 3,514,107    Dated May 26, 1970

Inventor(s) George O. Baumrucker

It is certified that error appears in the above-identified patent and that said Letters Patent are hereby corrected as shown below:

Column 1, line 3, for "George O. Baumbrucker" read -- George O. Baumrucker --.
Sheets 1 and 2 of the drawings, for "G. O. Baumbrucker" read -- G. O. Baumrucker --.

SIGNED AND
SEALED
SEP 22 1970

(SEAL)
Attest:

Edward M. Fletcher, Jr.
Attesting Officer

WILLIAM E. SCHUYLER, JR.
Commissioner of Patents